United States Patent [19]

Pelosi

[11] 4,226,954
[45] Oct. 7, 1980

[54] REACTIVE FLUID ADHESIVE COMPOSITIONS

[75] Inventor: Lorenzo F. Pelosi, Wilmington, Del.

[73] Assignee: E. I. Du Pont de Nemours and Company, Wilmington, Del.

[21] Appl. No.: 961,419

[22] Filed: Nov. 16, 1978

[51] Int. Cl.² .......................................... C08F 255/02
[52] U.S. Cl. .................................. 525/259; 427/302; 525/305
[58] Field of Search .................... 260/878 R; 525/291, 525/259, 305

[56] References Cited

U.S. PATENT DOCUMENTS

| | | | |
|---|---|---|---|
| 3,890,407 | 6/1975 | Briggs | 260/878R |
| 4,112,013 | 9/1978 | Briggs | 260/878 R |
| 4,138,449 | 2/1979 | Baldwin | 260/878 R |
| 4,170,612 | 10/1979 | Pastor | 525/259 |

Primary Examiner—Paul R. Michl

[57] ABSTRACT

Reduced odor is achieved in certain reactive fluid adhesive compositions while maintaining adequate adhesive properties by using higher molecular weight ($C_{10}$–$C_{18}$) acrylic and methacrylic ester monomers in combination with minor quantities of diacrylate or dimethacrylate monomers, instead of lower molecular weight acrylic and methacrylic ester monomers generally used in such adhesives.

7 Claims, No Drawings

REACTIVE FLUID ADHESIVE COMPOSITIONS

DESCRIPTION

1. Technical Field

This invention relates to reactive fluid adhesive compositions based on chlorosulfonated polyethylene, aldehyde-amine condensation product accelerator, peroxy free radical generator and a polymerizable vinyl monomer. In particular, this invention relates to reducing the odor of such adhesive compositions while maintaining adequate adhesive properties in such compositions.

2. Background Art

U.S. Pat. No. 3,890,407, granted June 17, 1975 to Briggs and Muschiatti, discloses certain reactive fluid adhesive compositions based on a sulfur-bearing composition selected from the group consisting of chlorosulfonated polyethylene and a mixture of sulfonyl chloride with chlorinated polyethylene, an aldehyde-amine condensation product accelerator, and a polymerizable vinyl monomer. Briggs and Muschiatti also disclose the use of a peroxy free radical generator and various other "polymerization catalysts," such as tertiary amine initiators and transition metal, organic salt, promotors, in such adhesive compositions. With respect to the polymerizable vinyl monomer, Briggs and Muschiatti disclose suitable monomers as including "acrylic monomers and mixtures of monomers, such as methyl methacrylate, ethyl methacrylate, acrylonitrile, methacrylonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, glycidyl methacrylate, itaconic acid, ethylene glycol and higher-glycol acrylates and methacrylates, acrylamide, and methacrylamide; halogenated monomers such as vinylidene chloride, chlorostyrene, 2,3-dichloro-1,3-butadiene, and 2-chloro-1,3-butadiene; and styrene and mono- and polyalkylstyrenes, such as methylstyrene, dimethylstyrene, ethylstyrene, or tert-butylstyrene. The preferred monomers are acrylic monomers, especially lower alkyl acrylates and methacrylates and ethylene glycol diacrylate and dimethacrylate." Briggs and Muschiatti also disclose in the Examples polymerizable monomers which comprise a mixture of a major proportion of lower alkyl methacrylates and a minor proportion of methacrylic acid.

It has been found, however, that such adhesive compositions suffer from a serious odor problem, particularly when the polymerizable monomer is one of the preferred lower alkyl acrylates or methacrylates.

DISCLOSURE OF THE INVENTION

The present invention relates to such adhesive compositions in which the odor problem has been substantially reduced or eliminated while maintaining the adhesive properties of the composition at satisfactory levels. This is achieved by using higher molecular weight acrylate or methacrylate monomers in combination with minor quantities of diacrylate or dimethacrylate monomers, instead of the lower molecular weight acrylic and methacrylic monomers generally used in such adhesives.

In particular, the present invention relates to improved reactive fluid adhesive compositions comprising chlorosulfonated polyethylene, aldehyde-amine condensation product accelerator, peroxy free radical generator, methacrylic acid and a monomer mixture consisting essentially of a major quantity of a high molecular weight acrylate or methacrylate and a minor quantity of a diacrylate or dimethacrylate, which improved reactive fluid adhesive composition substantially reduces or eliminates the odor problem generally associated with prior similar compositions while maintaining satisfactory adhesive properties.

More specifically, the compositions of the present invention comprise chlorosulfonated polyethylene, aldehyde-amine condensation product, peroxy free radical generator, methacrylic acid and a monomer mixture consisting essentially of a major quantity i.e., at least 50 weight percent, of the monomer mixture of an alkyl acrylate or methacrylate having 10–18 carbon atoms in the alkyl portion, and a minor quantity, i.e., not more than 50 weight percent, of a diacrylate or dimethacrylate.

The chlorosulfonated polyethylene can be prepared in a manner well known to those skilled in the art by reaction of linear or branched polyethylene and sulfuryl chloride, or sulfur dioxide and chlorine. Chlorosulfonated polyethylene is also available commercially from E. I. du Pont de Nemours and Company, Wilmington, Del., as Hypalon ® synthetic rubber. In practice, the chlorosulfonated polyethylene may also be a chlorosulfonated copolymer of ethylene with small proportions of propylene or other olefins. Various chlorosulfonated polyethylenes and methods of their preparation are discussed, for example, in U.S. Pat. No. 2,982,759, which is incorporated herein by reference. The relative proportions of the chlorosulfonated polyethylene and the monomer mixture should be from about 25–2000 parts, preferably 50–500 parts, by weight of the monomer mixture per 100 parts of chlorosulfonated polyethylene.

The aldehyde-amine condensation product can be prepared from any of a variety of aldehydes and amines. The aldehyde will preferably be an aliphatic aldehyde having 1–12 carbon atoms. Any primary aliphatic or aromatic amine having up to about 18 carbon atoms is suitable. Several useful accelerators are described in the above cited U.S. Pat. No. 3,591,438.

Typical aldehydes include, for example, acetaldehyde, butyraldehyde, propionaldehyde, cyclopentanal, hexanal, cyclohexanal, hydrocinnamaldehydes, heptanal, decanal, and dodecanol. Typical amines include, for example, ethylamine, butylamine, pentylamine, cyclopentylamine, hexylamine, cyclohexylamine, octylamine, decylamine, dodecylamine, hexadecylamine, octadecylamine, aniline, tolyl amines, and xylyl amines. In both the aldehyde and the amine series, various-position isomers are possible. Alternatively, the aldehyde-amine condensation product can be selected from those commercially available, e.g., E. I. du Pont de Nemours "808" and "833" accelerators. The aldehydeamine condensation product will be present in the adhesive composition in an amount up to 15 weight percent, preferably 0.01–1.5 weight percent. It should be understood that when all of the components of the present adhesive are present in intimate admixture with each other, the adhesive composition will set quite rapidly. Thus, to insure reasonable shelf life, one or more of these components must be segregated from the others until the adhesive is to be used. It is sufficient and most convenient if only the aldehydeamine condensation product is segregated from the other components, and is admixed therewith just prior to use or preferably applied to one or more of the surfaces to be bonded prior to application of the remainder of the adhesive composition.

The peroxy free radical generator can be an organic peroxide, an organic hydroperoxide, a perester or a peracid, e.g., cumene hydroperoxide, benzoyl peroxide, acetyl peroxide, t-butyl hydroperoxide, lauroyl peroxide, methyl ethyl ketone peroxide, t-butyl perbenzoate, di-t-butyl diperphthalate and t-butyl peracetate. The peroxy free radical generator can be present in an amount up to 10 weight percent, preferably 0.05-3 weight percent.

The methacrylic acid will be present in the reactive fluid adhesive compositions of the present invention in an amount of 5-15 weight percent, preferably 7.5-12.5, most preferably about 10 weight percent, of the adhesive composition.

The monomer mixture comprises a major proportion, preferably 60-95 weight percent, most preferably 70-90 weight percent, of a $C_{10}$-$C_{18}$ alkyl acrylate or methacrylate and a minor proportion, preferably 5-40 weight percent, most preferably 10-30 weight percent, of a diacrylate or a dimethacrylate. Preferred monomers for the major proportion of the monomer mixture include, m-decylmethacrylate, iso-decylmethacrylate, lauryl methacrylate and stearyl methacrylate. Stearyl methacrylate is more preferred. It should be understood that it is suitable to use commercially available high molecular weight methacrylates, such as stearyl methacrylate, lauryl methacrylate and isodecyl methacrylate available from Rohm and Haas Company, Philadelphia, Pennsylvania, but that such methacrylates are not pure. For example, commercially available stearyl methacrylate is believed to be 30% $C_{16}$ ester, 60% $C_{18}$ ester and 10% various impurities, including alcohols and methacrylic acid; lauryl methacrylate is believed to be 66% $C_{12}$ ester, 25% $C_{14}$ ester, 8% other methacrylates, and 1% unknown; and isodecyl methacrylate is believed to be 97.5% i-$C_{10}$ ester, 2.5% unknown.

Preferred monomers for the minor proportion of the monomer mixture include ethylene dimethacrylate and 1,3-butylene dimethacrylate. Ethylene dimethacrylate is preferred. It has unexpectedly been found that inclusion of relatively small quantities of dimethacrylate into the adhesive composition gives substantial increase, i.e., greater than 20%, in the lap shear strength obtained with that adhesive, even at room temperature. It has also been found that too much dimethacrylate negates this benefit, and at the same time has a significantly adverse effect on the T-peel strength of the adhesive composition. Thus, it is important to formulate the adhesive composition at or near its optimum for the particular circumstances. Among the factors affecting this optimum are the particular high molecular weight methacrylate chosen, the particular adhesive property of most concern, the quantity of methacrylate and methacrylic acid, and the substrates to be adhered. However, generally the quantity of dimethacrylate should be not more than 50 weight percent of the monomer mixture, preferably 3-40 weight percent, and most preferably 10-30 weight percent.

The following examples identify various specific compositions of the present invention and further provide a comparison of adhesive properties of such compositions with the properties of similar compositions outside the scope of the present invention. In these examples, all parts and percentages are by weight unless stated otherwise.

EXAMPLES

Compositions were prepared by rolling in a jar at room temperature the stated quantities of methacrylate (containing 100 ppm of hydroquinone inhibitor), glacial methacrylic acid (containing 250 ppm of 4-methoxyphenol), ethylene glycol dimethacrylate, and chlorosulfonated polyethylene ("Hypalon" 30), until a homogeneous syrup was obtained (1-7 days).

An adhesive composition was prepared by intimately mixing 0.5 g of cumene hydroperoxide with 100 g of the above syrup.

Lap shear bonds were prepared by applying to lightly sanded, toluene degreased, cold rolled steel coupons (25 mm×76 mm×1.6 mm) an accelerator which was a mixture of butyraldehyde and aniline condensation product (sold by Du Pont as Accelerator "808"). The accelerator was applied with a brush and the excess wiped to a thin film with a piece of cloth. The adhesive composition was pressed between the treated steel coupons in a mold to give a layer 0.2 mm×25 mm×13 mm. The specimens were stored for >24 hours in air at room temperature and then tested at a separation rate of 13 mm/min (ASTM D-1002-64).

T-peel specimens were prepared by pressing the adhesive composition between two "808" primed 25 mm×254 mm×0.5 mm lightly sanded, toluene degreased cold rolled steel strips separated by 0.25 mm o-ring spacers. The samples were stored as described above and tested in 180° peel at a separation speed of 254 mm/min (ASTM-D-1876-61T).

TABLE I

| ISODECYL METHACRYLATE FORMULATIONS | | | | | | | | | | |
|---|---|---|---|---|---|---|---|---|---|---|
| Example | 1 | 2 | 3 | 4 | 5 | 6 | 7 | 8 | 9 | 10 |
| Chlorosulfonated polyethylene[1] | 26 | → | → | → | → | → | → | → | → | → |
| Methacrylic Acid | — | 10 | → | → | → | → | → | → | → | → |
| Isodecyl Methacrylate | 74 | 64 | 63 | 59 | 54 | 49 | 39 | 24 | 14 | — |
| Ethylene Dimethacrylate | — | — | 1 | 5 | 10 | 15 | 25 | 40 | 50 | 64 |
| Cumene Hydroperoxide | 0.5 | → | → | → | → | → | → | → | → | → |
| Accelerator "808" | Two-Side Activation | | → | → | → | → | → | → | → | → |
| Lap Shear (0.25 mm) | | | | | | | | | | |
| psi | 200 | 1183 | 1507 | 1587 | 1510 | 1807 | 1730 | 920 | 507 | 397 |
| MPa | 1.4 | 8.2 | 10.4 | 10.9 | 10.4 | 12.5 | 11.9 | 6.3 | 3.5 | 2.7 |
| T-Peel (0.25 mm) | | | | | | | | | | |
| pli | 10 | 37 | 23 | 15 | 10 | 8 | 4 | 1.7 | 1.3 | 1.7 |
| kN/m | 1.7 | 6.5 | 4.0 | 2.6 | 1.7 | 1.4 | 0.7 | 0.3 | 0.2 | 0.3 |

TABLE I-continued

ISODECYL METHACRYLATE FORMULATIONS

| Example | 11 | 12 | 13 | 14 | 15 | 16 | 17 | 18 | 19 | 20 |
|---|---|---|---|---|---|---|---|---|---|---|
| Chlorosulfonated polyethylene[1] | 30 | → | → | → | → | 35 | → | → | → | → |
| Methacrylic Acid | 10 | → | → | → | → | → | → | → | → | → |
| Isodecyl Methacrylate | 55 | 50 | 45 | 40 | 30 | 50 | 45 | 40 | 35 | 25 |
| Ethylene Dimethacrylate | 5 | 10 | 15 | 20 | 30 | 5 | 10 | 15 | 20 | 30 |
| Cumene Hydroperoxide | 0.5 | → | → | → | → | → | → | → | → | → |
| Accelerator "808" | Two-Side Activation | | → | → | → | → | → | → | → | → |
| Lap Shear (0.25 mm) | | | | | | | | | | |
| psi | 1477 | 1800 | 1693 | 1433 | 1040 | 1803 | 2380 | 2080 | 1487 | 1493 |
| MPa | 10.2 | 12.4 | 11.7 | 9.9 | 7.2 | 12.4 | 16.4 | 14.3 | 10.2 | 10.3 |
| T-Peel (0.25 mm) | | | | | | | | | | |
| pli | 10.5 | 12.5 | 5.5 | 5.5 | 4.5 | 8 | 7 | 5 | 5 | 6 |
| kN/m | 1.8 | 2.2 | 1.0 | 1.0 | 0.8 | 1.4 | 1.2 | 0.9 | 0.9 | 1.0 |

[1]Made from branched polyethylene having a melt index of 100 and containing 43 percent chlorine and 34 mmoles sulfonyl chloride per 100 grams of polymer.

TABLE II n-DECYL METHACRYLATE FORMULATIONS

| Example | 21 | 22 | 23 | 24 | 25 | 26 | 27 | 28 | 29 |
|---|---|---|---|---|---|---|---|---|---|
| Chlorosulfonated polyethylene[1] | 20 | → | → | → | → | → | → | → | → |
| Methacrylic Acid | — | 10 | → | → | → | → | → | → | → |
| n-Decyl Methacrylate | 80 | 70 | 69 | 65 | 60 | 55 | 45 | 30 | 25 |
| Ethylene Dimethacrylate | — | — | 1 | 5 | 10 | 15 | 25 | 40 | 45 |
| Cumene Hydroperoxide | 0.5 | → | → | → | → | → | → | → | → |
| Accelerator "808" | Two-Side Activation | | → | → | → | → | → | → | → |
| Lap Shear (0.25 mm) | | | | | | | | | |
| psi | 8 | 807 | 1153 | 1387 | 1510 | 1430 | 1520 | 1483 | 1260 |
| MPa | 0 | 5.6 | 7.9 | 9.6 | 10.4 | 9.9 | 10.5 | 10.2 | 8.7 |
| T-Peel (0.25 mm) | | | | | | | | | |
| pli | 11 | 19 | 18.6 | 14 | 14 | 6.5 | 3.5 | 1.5 | 3 |
| kN/m | 1.9 | 3.3 | 3.2 | 2.4 | 2.4 | 1.1 | 0.6 | 0.3 | 0.5 |

[1]Made from branched polyethylene having a melt index of 100 and containing 43 percent chlorine and 34 mmoles sulfonyl chloride per 100 grams of polymer.

TABLE III

LAURYL METHACRYLATE FORMULATIONS

| Example | 30 | 31 | 32 | 33 | 34 | 35 | 36 | 37 | 38 | 39 |
|---|---|---|---|---|---|---|---|---|---|---|
| Chlorosulfonated polyethylene[1] | 20 | → | → | → | → | → | → | → | → | → |
| Methacrylic Acid | — | 10 | → | → | → | → | → | → | → | → |
| Lauryl Methacrylate | 80 | 70 | 69 | 65 | 60 | 55 | 45 | 30 | 25 | — |
| Ethylene Dimethacrylate | — | — | 1 | 5 | 10 | 15 | 25 | 40 | 45 | 70 |
| Cumene Hydroperoxide | 0.5 | → | → | → | → | → | → | → | → | → |
| Accelerator "808" | Two-Side Activation | | → | → | → | → | → | → | → | → |
| Lap Shear (0.25 mm) | | | | | | | | | | |
| psi | 0 | 512 | 860 | 1117 | 1240 | 1428 | 1530 | 1420 | 1473 | 530 |
| MPa | 0 | 3.5 | 5.9 | 7.7 | 8.5 | 9.8 | 10.5 | 9.8 | 10.2 | 3.6 |
| T-Peel (0.25 mm) | | | | | | | | | | |
| pli | 4.5 | 14 | 15 | 11 | 5 | 3.5 | 2.5 | 1.5 | 0.7 | 1 |
| kN/m | 0.8 | 2.4 | 2.6 | 1.9 | 0.9 | 0.6 | 0.4 | 0.3 | 0.1 | 0.2 |

| Example | 40 | 41 | 42 | 43 | 44 | 45 | 46 | 47 | 48 | 49 |
|---|---|---|---|---|---|---|---|---|---|---|
| Chlorosulfonated polyethylene[1] | 26 | → | → | → | → | 30 | → | → | → | → |
| Methacrylic Acid | 10 | → | → | → | → | → | → | → | → | → |
| Lauryl Methacrylate | 59 | 49 | 44 | 39 | 34 | 55 | 45 | 40 | 35 | 30 |
| Ethylene Dimethacrylate | 5 | 15 | 20 | 25 | 30 | 5 | 15 | 20 | 25 | 30 |
| Cumene Hydroperoxide | 0.5 | → | → | → | → | → | → | → | → | → |
| Accelerator "808" | Two-Side Activation | | → | → | → | → | → | → | → | → |
| Lap Shear (0.25 mm) | | | | | | | | | | |
| psi | 1290 | 1620 | 1639 | 1207 | 1320 | 1120 | 1327 | 1317 | 1123 | 1083 |

TABLE III-continued
LAURYL METHACRYLATE FORMULATIONS

| MPa | 8.9 | 11.2 | 11.3 | 8.3 | 9.1 | 7.7 | 9.1 | 9.1 | 7.7 | 7.5 |
|---|---|---|---|---|---|---|---|---|---|---|
| T-Peel (0.25 mm) | | | | | | | | | | |
| pli | 11 | 7 | 4.4 | 5 | 3 | 17.5 | 6.5 | 5 | 5 | 4.5 |
| kN/m | 1.9 | 1.2 | 0.8 | 0.9 | 0.5 | 3.1 | 1.1 | 0.9 | 0.9 | 0.8 |

| Example | 50 | 51 | 52 | 53 | 54 |
|---|---|---|---|---|---|
| Chlorosulfonated polyethylene[1] | 35 | → | → | → | → |
| Methacrylic Acid | 10 | → | → | → | → |
| Lauryl Methacrylate | 50 | 40 | 35 | 30 | 25 |
| Ethylene Dimethacrylate | 5 | 15 | 20 | 25 | 30 |
| Cumene Hydroperoxide | 0.5 | → | → | → | → |
| Accelerator "808" | Two-side Activation | | | → | → |
| Lap Shear (0.25 mm) | | | | | |
| psi | 1350 | 1807 | 1810 | 1547 | 1210 |
| MPa | 9.3 | 12.5 | 12.5 | 10.7 | 8.3 |
| T-Peel (0.25 mm) | | | | | |
| pli | 14 | 7.5 | 6 | 7 | 6.5 |
| kN/m | 2.4 | 1.3 | 1.0 | 1.2 | 1.1 |

[1]Made from branched polyethylene having a melt index of 100 and containing 43 percent chlorine and 34 mmoles sulfonyl chloride per 100 grams of polymer.

TABLE IV
STEARYL METHACRYLATE FORMULATIONS

| Example | 55 | 56 | 57 | 58 | 59 | 60 | 61 | 62 | 63 | 64 |
|---|---|---|---|---|---|---|---|---|---|---|
| Chlorosulfonated polyethylene[1] | 20 | → | → | → | → | 26 | → | → | → | → |
| Methacrylic Acid | 10 | → | → | → | → | → | → | → | → | → |
| Stearyl Methacrylate | 60 | 55 | 45 | 30 | 25 | 54 | 49 | 44 | 39 | 34 |
| Ethylene Dimethacrylate | 10 | 15 | 25 | 40 | 45 | 10 | 15 | 20 | 25 | 30 |
| Cumene Hydroperoxide | 0.5 | → | → | → | → | → | → | → | → | → |
| Accelerator "808" | Two Side Activation | | | → | → | → | → | → | → | → |
| Lap Shear (0.25 mm) | | | | | | | | | | |
| psi | 1127 | 975 | 1175 | 1177 | 1105 | 1207 | 1167 | 1363 | 1517 | 1653 |
| MPa | 7.8 | 6.7 | 8.1 | 8.1 | 7.6 | 8.3 | 8.0 | 9.4 | 10.5 | 11.4 |
| T-Peel (0.25 mm) | | | | | | | | | | |
| pli | 4.5 | 3.5 | 2 | 2 | 1.7 | 8 | 6 | 6.5 | 5 | 7.5 |
| kN/m | 0.8 | 0.6 | 0.3 | 0.3 | 0.3 | 1.4 | 1.0 | 1.1 | 0.9 | 1.3 |

| Example | 65 | 66 | 67 | 68 | 69 | 70 | 71 | 72 | 73 | 74 |
|---|---|---|---|---|---|---|---|---|---|---|
| Chlorosulfonated polyethylene[1] | 30 | → | → | → | → | 35 | → | → | → | → |
| Methacrylic Acid | 10 | → | → | → | → | → | → | → | → | → |
| Stearyl Methacrylate | 50 | 45 | 40 | 35 | 30 | 45 | 40 | 35 | 30 | 25 |
| Ethylene Dimethacrylate | 10 | 15 | 20 | 25 | 30 | 10 | 15 | 20 | 25 | 30 |
| Cumene Hydroperoxide | 0.5 | → | → | → | → | → | → | → | → | → |
| Accelerator "808" | Two-Side Activation | | | → | → | → | → | → | → | → |
| Lap Shear (0.25 mm) | | | | | | | | | | |
| psi | 1440 | 1307 | 1327 | 1367 | 1313 | 1567 | 1423 | 1307 | 1210 | 850 |
| MPa | 9.9 | 9.0 | 9.1 | 9.4 | 9.0 | 10.8 | 9.8 | 9.0 | 8.3 | 5.9 |
| T-Peel (0.25 mm) | | | | | | | | | | |
| pli | 8 | 6.5 | 6 | 6 | 4.5 | 11 | 7.5 | 6 | 6 | 4.5 |
| kN/m | 1.4 | 1.1 | 1.0 | 1.0 | 0.8 | 1.9 | 1.3 | 1.0 | 1.0 | 0.8 |

[1]Made from branched polyethylene having a melt index of 100 and containing 43 percent chlorine and 34 mmoles sulfonyl chloride.

Industrial Applicability

The reactive fluid adhesive compositions of the present invention are particularly well suited as high performance or structural adhesives, particularly in applications where odor can be a serious deterrent to use. Examples of substrates which can be bonded with the adhesives of the present invention include metals, such as cold-rolled steel, hot-rolled steel, stainless steel, aluminum, copper, brass and bronze, vinyl film to particle board, vinyl film to steel and plastic pipe.

Best Mode

Although the best mode of the present invention, i.e., the single most preferred reactive fluid adhesive composition of the present invention, will depend on the particular desired end use and the specific requisite combination of properties for that use, the single most preferred compositions of the present invention for the widest variety of possible end uses will generally contain approximately 35% chlorosulfonated polyethylene, 45% methacrylate, 10% methacrylic acid and 10% ethylene dimethacrylate. Further, of the various methacrylates, lauryl methacrylate seems to offer the best combination of properties. Example 51 comes closest to approximating the best mode of the present invention.

I claim:

1. A composition suitable for use as an adhesive when combined with an aldehyde-amine condensation product, said composition comprising chlorosulfonated polyethylene, peroxy free radical generator, methacrylic acid, and a monomer mixture consisting essentially of a major proportion of at least one compound selected from the group consisting of $C_{10}$–$C_{18}$ acrylates and $C_{10}$–$C_{18}$ methacrylates, and a minor proportion of at least one compound selected from the group consisting of diacrylates and dimethacrylates, wherein the diacrylates and dimethacrylates comprise 10–30 weight percent of the monomer mixture.

2. The composition of claim 1 wherein the $C_{10}$–$C_{18}$ acrylates and $C_{10}$–$C_{18}$ methacrylates are selected from the group consisting of iso-decyl methacrylate, n-decylmethacrylate, lauryl methacrylate and stearyl methacrylate.

3. The composition of claim 1 wherein the relative proportions of the chlorosulfonated polyethylene and the monomer mixture are from 25–2000 parts by weight of the monomer mixture per 100 parts by weight of the chlorosulfonated polyethylene.

4. The composition of claim 3 wherein the relative proportions of the chlorosulfonated polyethylene and the monomer mixture are from 50–500 parts by weight of the monomer mixture per 100 parts by weight of the chlorosulfonated polyethylene.

5. The composition of claim 1 wherein the at least one compound selected from the group consisting of diacrylates and dimethacrylates is ethylene dimethacrylate.

6. A method for adhering at least two surfaces to each other which comprises applying to at least one of said surfaces an aldehyde-amine condensation product, applying to at least one of said surfaces the composition of claim 1, and pressing said surfaces into intimate contact with each other.

7. A composition suitable for use as an adhesive when combined with an aldehyde-amine condensation product, said composition comprising chlorosulfonated polyethylene, peroxy free radical generator, methacrylic acid, and a monomer mixture consisting essentially of a major proportion of at least one compound selected from the group consisting of $C_{10}$–$C_{18}$ acrylates and $C_{10}$–$C_{18}$ methacrylates, and a minor proportion of at least one compound selected from the group consisting of diacrylates and dimethacrylates, wherein the diacrylates and dimethacrylates comprise 5–40 weight percent of the monomer mixture, provided that when the compound selected from the group consisting of $C_{10}$–$C_{18}$ acrylates and $C_{10}$–$C_{18}$ methacrylates is lauryl methacrylate, then the sum of the quantity of chlorosulfonated polyethylene and the quantity of diacrylates and dimethacrylates is 40–50 weight percent of the adhesive composition.

* * * * *